UNITED STATES PATENT OFFICE.

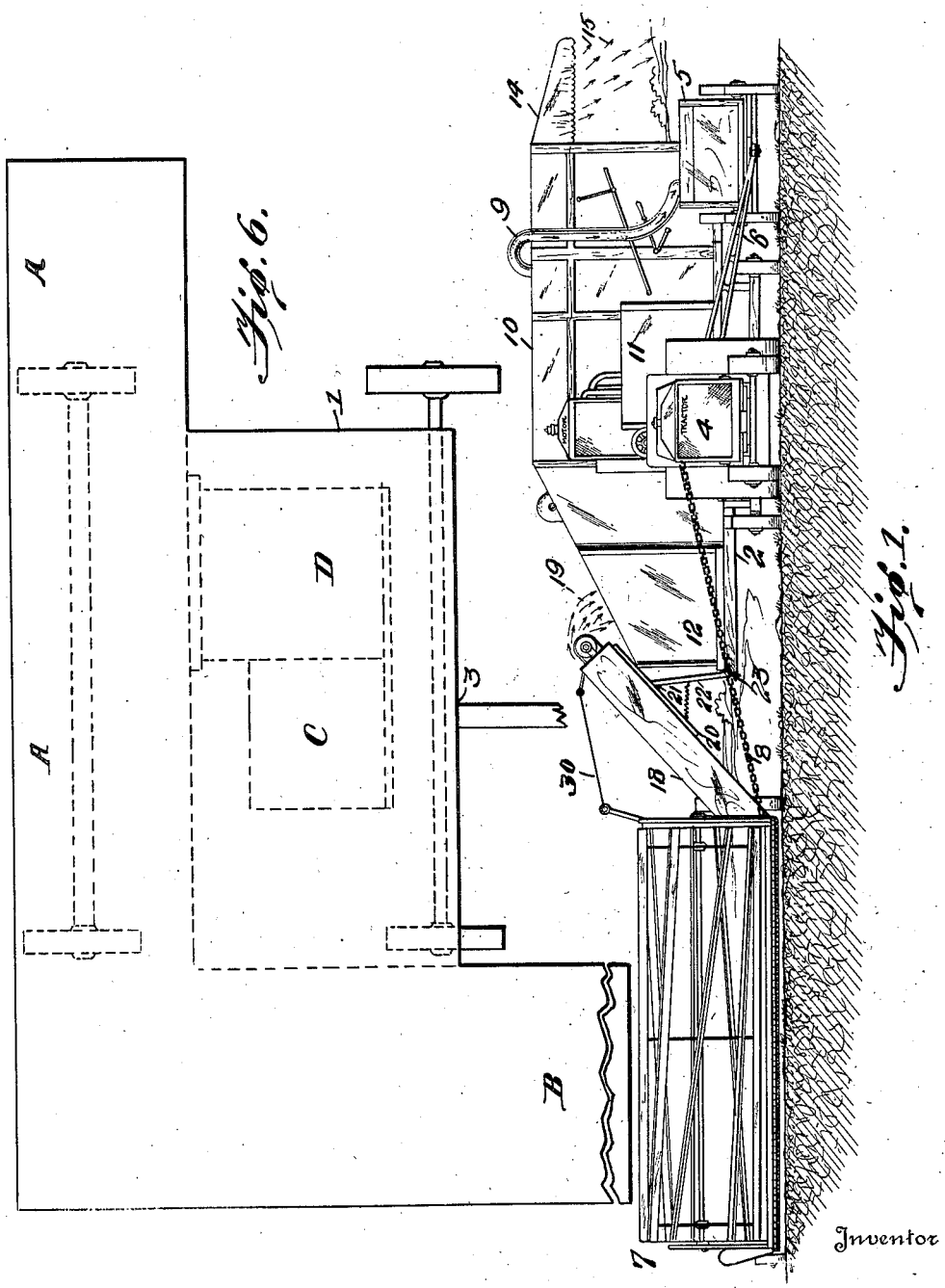

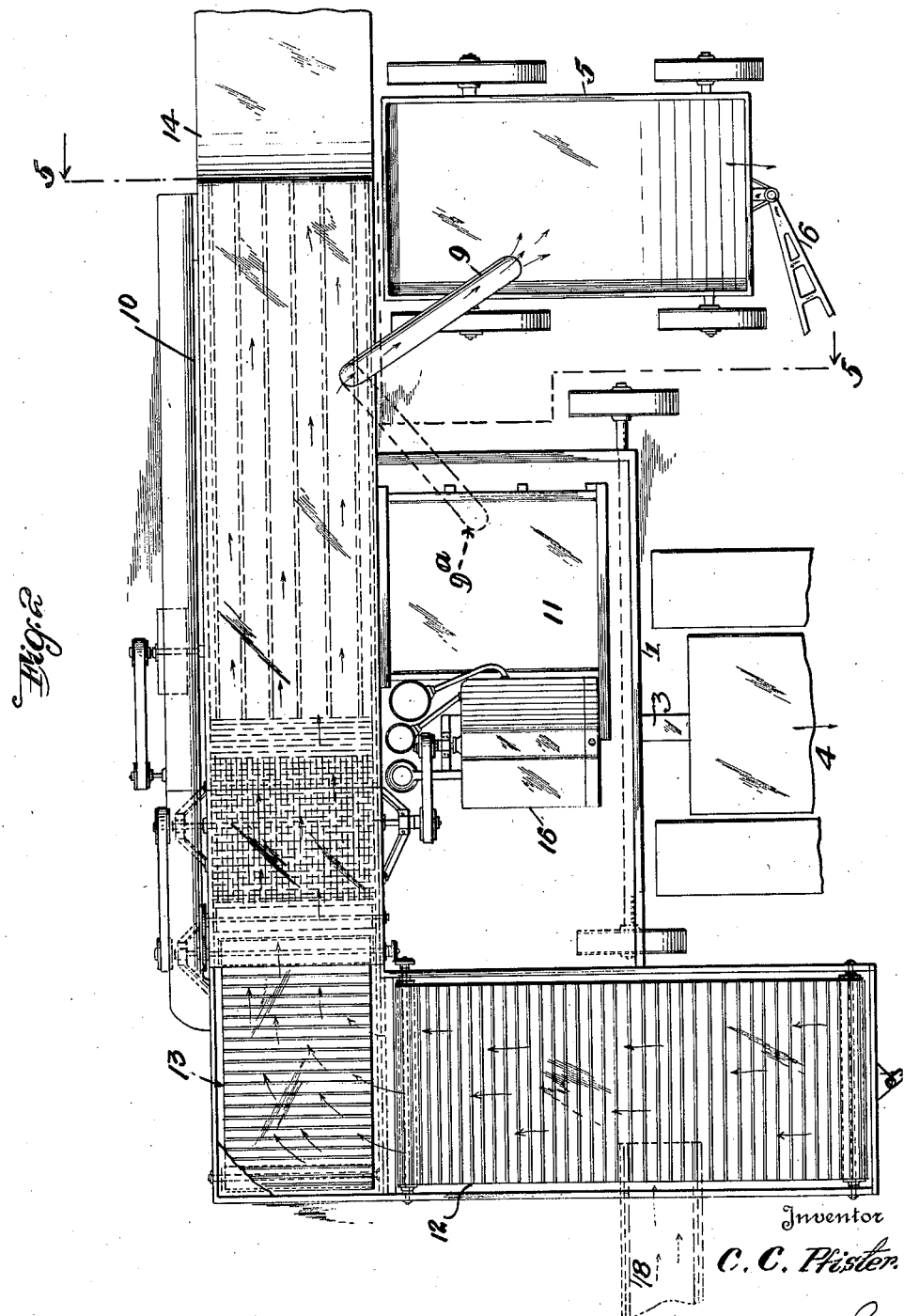

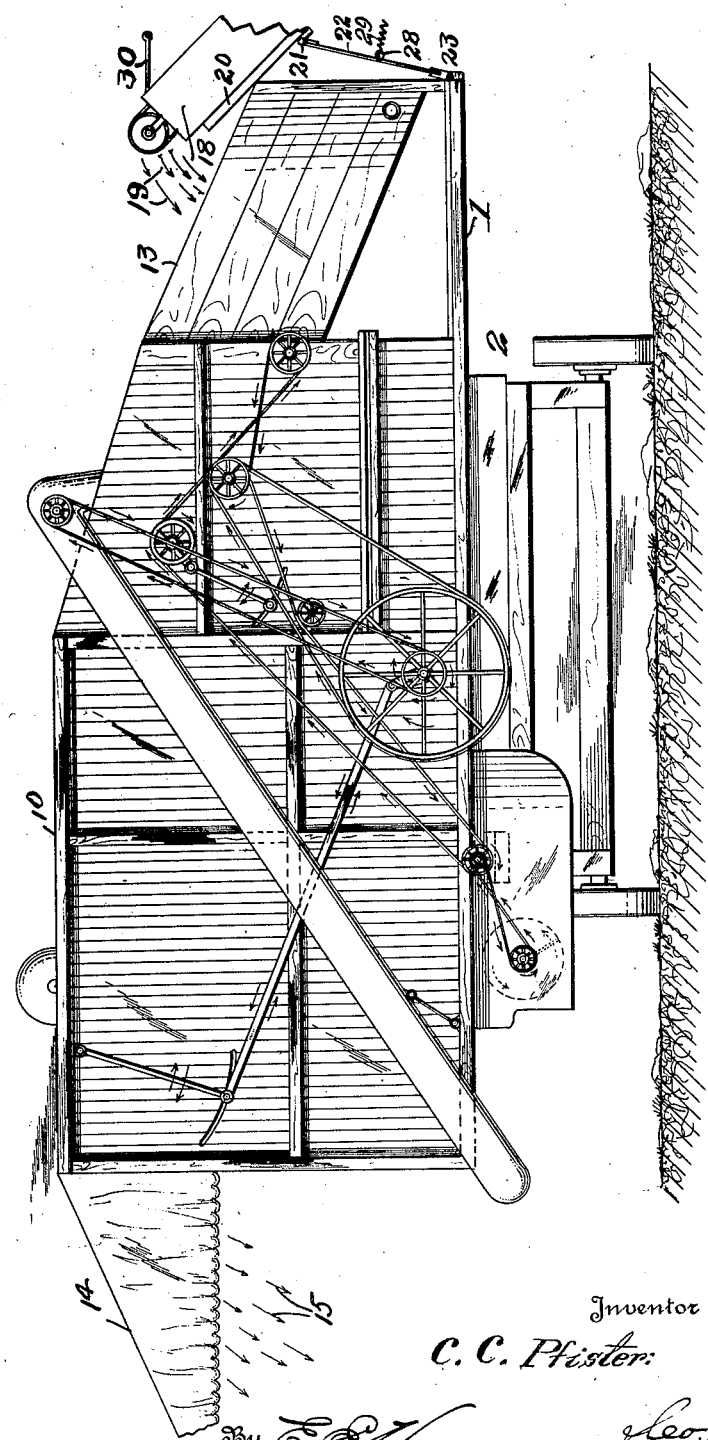

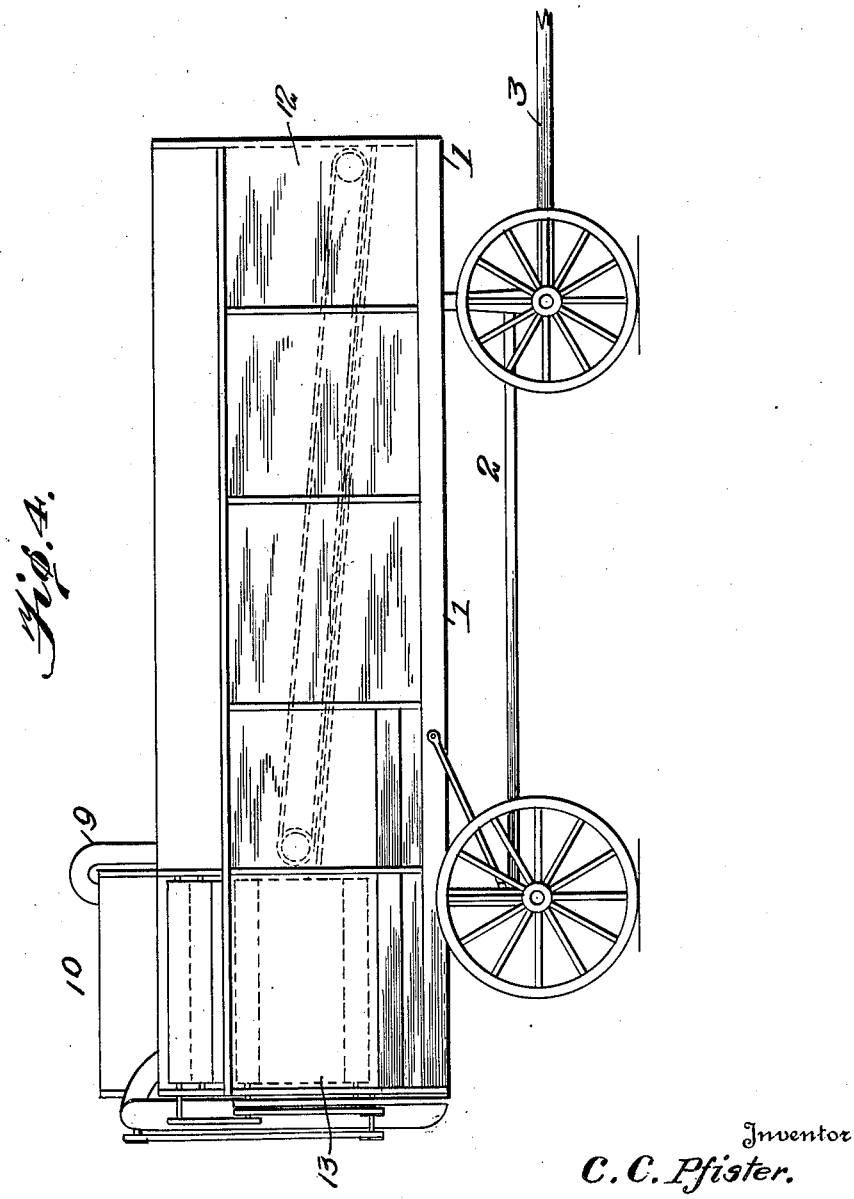

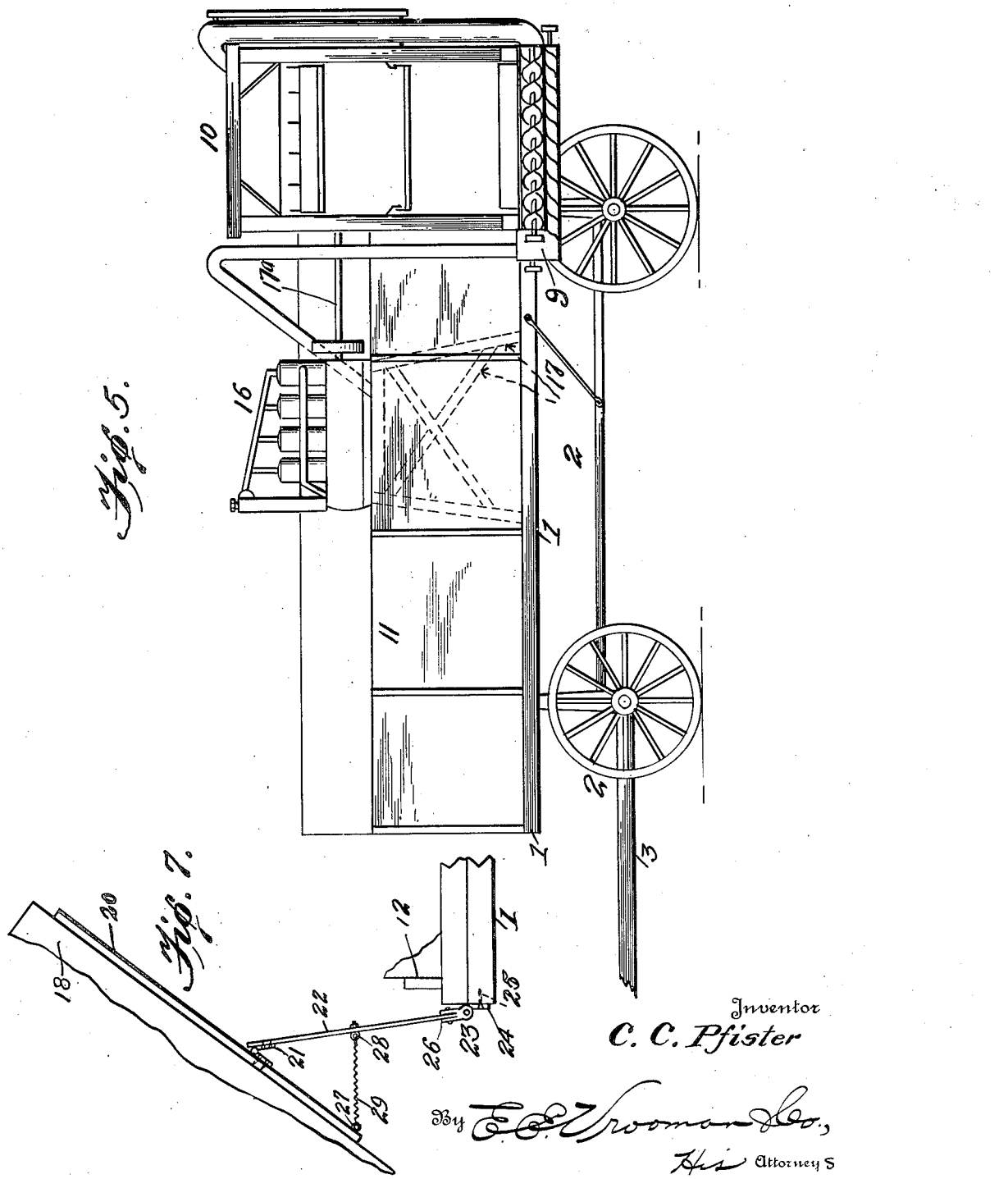

CHARLES C. PFISTER, OF PAWNEE ROCK, KANSAS.

EXTENSION FEEDER AND THRASHER.

1,423,149.    Specification of Letters Patent.    Patented July 18, 1922.

Application filed March 10, 1921. Serial No. 451,374.

*To all whom it may concern:*

Be it known that I, CHARLES C. PFISTER, a citizen of the United States, residing at Pawnee Rock, in the county of Barton and State of Kansas, have invented certain new and useful Improvements in an Extension Feeder and Thrasher, of which the following is a specification, reference being had therein to the accompanying drawings.

This apparatus relates to an extension feeder and thrasher, and the object of the invention is to construct a harvester-thrasher apparatus in which a header or mowing machine of any make, size, or construction, can be assembled with the apparatus without changing a bolt, or any adjustment of any sort, of a threshing machine.

Another object of the invention is the construction of an improved truck, involving a platform upon which is positioned the primary conveyer, motor, bin-box, thrasher, and to the side of which is attached the header or mowing machine.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a front view in elevation of an apparatus constructed in accordance with the present invention, while Figure 2 is a top, plan view of the same with the header or mowing machine removed.

Figure 3 is a rear or back view of a portion of the apparatus.

Figure 4 is an end view, looking at the primary conveyor or the left-hand end of the apparatus.

Figure 5 is a sectional view, taken on line 5—5, Fig. 2, and looking in the direction of the arrows.

Figure 6 is a top, plan view of the platform of the truck.

Figure 7 is an enlarged, fragmentary view of the connecting device for fastening the mower conveyor to the platform.

Referring to the drawings by numerals, 1 designates the platform that is supported upon the truck 2. Attached, at 3, Fig. 2, to the platform 1 is a tractor 4 for drawing or pulling the entire apparatus over a field.

The platform 1 is of a peculiar structure, including the thrasher portion A—A, the primary conveyor portion B, and the motor portion C, and the bin-box portion D; it is to be noted that the central part of the platform is comparatively wide but that it is extended at opposite corners to produce the primary conveyor portion B and the extended right-hand end portion A of the thrasher portion, for permitting the assembling in a compact and relatively simple manner several of the cooperating devices of the apparatus.

A wagon 5, for hauling grain, is connected by suitable fastening means 6 to the tractor, and the header or mowing machine 7 (Fig. 1) is also connected to the tractor by suitable fastening means, such as chain 8, so that the tractor pulls the header or mowing machine, truck 2 and wagon 5 at the same time. When the wagon is filled with grain, by reason of the grain conveyor 9 discharging therein, the wagon can be detached from the tractor and pulled by any suitable means to storage house or elevator, and while the wagon is away, or another wagon is being placed in position contiguous to the thrasher 10, the grain conveyor 9 can be swung to the dotted position 9ᵃ (Fig. 2), permitting the grain to be discharged into the bin-box 11 carried at D on the platform 1, Figs. 2 and 6. The thrasher 10 is positioned on the portion A—A of the platform 1 and extends over a greater portion of the rear of the platform, and on the portion B of the platform is the primary conveyor 12, which conveyor 12 discharges upon the auxiliary conveyor 13, and the auxiliary conveyor discharges into the thrasher 10. After the grain has been threshed, or separated from the straw and chaff, it is ultimately discharged through the grain conveyor 9, either into the wagon 5 or the bin-box 11; the straw and chaff being discharged from the hood 14 in the direction of the arrows 15, down upon the ground.

The motor 16 is mounted upon a suitable frame, shown in dotted lines 17, Fig. 5, upon the portion C of platform 1. This motor 16 has a driving shaft 17ª that extends into the thrasher 10, and the motor is the means for driving the different parts of the thrasher in unison with the conveyors 12 and 13.

The header or mowing machine 7 is provided with a mower conveyor 18 which discharges upon the primary conveyor 12, as shown by arrows 19; to the under-face of conveyor 18 is fastened a strip 20 to which strip is attached hinge 21. A brace 22 is fastened, at its upper end, to hinge 21, so that said brace is hingedly connected to the conveyor 18. A hinge 23 is employed for hingedly connecting the brace 22 to the platform 1; this hinge 23 is provided with a leaf 24, Fig. 7, that is fastened by any suitable means, such as screw 25, to the outer edge of the platform, and the bifurcated leaf 26, of hinge 23, receives the lower end of brace 22, in which leaf said brace is fastened. An eye-bolt 27 is fastened to the lower end of strip 20, and an eye-bolt 28 is fastened to brace 22, and the ends of coil spring 29 are hooked in these bolts 27 and 28. The object of the spring is to hold the mower conveyor 18 up against the primary conveyor 12, so that the discharging of the cut grain upon the conveyor 12 will always be efficiently accomplished, even though the apparatus is moving over uneven or hilly ground; the construction of the connecting device for the mower conveyor and the platform is such as to give a slight hinging or what might be styled a yieldable connection for increasing the efficiency of the apparatus, and yet, not in any way decreasing its durability. It will readily be seen that the header or mower, for cutting the grain, can be attached anywhere along the edge of the platform 1, permitting different kinds, or size, headers or mowers to be used by simply removing the fastening means, as I have shown in this embodiment as screw 25, and moving the hinge 23 to any point along the side edge of the platform 1.

An auxiliary cable support 30, Fig. 1, is utilized for assisting in supporting the load of the conveyor 18 upon the header or mower 7, but the major portion of the load is supported upon the connecting device, including brace 22, as specifically illustrated in Fig. 7.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination with a wheeled truck, of a platform provided with a central enlarged portion and with extensions projecting at right-angles from said central enlarged portion, a bin-box on said central enlarged portion contiguous to one of said extensions, a wagon contiguous to the bin-box and one of said extensions, a thrasher on the enlarged portion of the platform and an extension, conveyors on the other extension of the platform and discharging into said thrasher, means for operating the thrasher and the conveyors, a grain conveyor connected to the thrasher and adapted to discharge either into said wagon or said bin-box at the will of the operator, and means for connecting the wagon and the truck to a tractor.

2. In an apparatus of the class described, the combination with a platform, of a conveyor on said platform contiguous to one edge, a mower conveyor extending over said first-mentioned conveyor, a brace hingedly connected to said mower conveyor and to said platform, and a spring connected at one end to said mower conveyor and at its other end to said brace for holding the mower conveyor in a set position with respect to the first-mentioned conveyor.

3. In an apparatus of the class described, the combination with a platform, of a conveyor on said platform contiguous to one edge, a mower conveyor extending over said first-mentioned conveyor, a strip secured to the bottom of the mower conveyor, a brace hingedly connected at its upper end to said strip, a hinge provided with a bifurcated leaf detachably secured to the edge of the platform contiguous to the first-mentioned conveyor, the lower end of said brace secured in the bifurcated leaf of said hinge, eye-bolts secured to said trip and brace, and a coil spring provided with ends fastened to said eye-bolts, substantially as shown and described.

4. In an apparatus of the class described, the combination with a wheeled truck, of a platform on said truck, a thrasher on said platform, conveying means on said platform and discharging into said thrasher, a mower provided with a mower conveyor discharging cut grain upon said conveying means, means hingedly connecting said mower conveyor to said platform at any place along one edge, and yieldable means for holding the hinged connection and the mower conveyor in a set position for permitting regular discharging of cut grain upon the conveying means.

5. In an apparatus of the class described, the combination with a wheeled truck, of a platform carried by said truck, a thrasher and conveying means upon said platform, said conveying means adapted to discharge cut grain into said thrasher, a mowing machine provided with means discharging cut grain upon said conveying means, a wagon for receiving threshed grain positioned contiguous to said thrasher and said platform, a tractor contiguous to said platform and wheeled truck, and means connecting the thrasher to said truck, wagon and mowing means, whereby all will be synchronously moved or pulled over the ground.

In testimony whereof I hereunto affix my signature.

CHARLES C. PFISTER.